United States Patent
Ozawa

(10) Patent No.: US 6,257,720 B1
(45) Date of Patent: Jul. 10, 2001

(54) FOLDABLE EYEGLASSES

(75) Inventor: Hideo Ozawa, Fukui (JP)

(73) Assignee: Mitani USA, Inc., New York, NY (US)

( * ) Notice: Subject to any disclaimer, the term of this patent is extended or adjusted under 35 U.S.C. 154(b) by 0 days.

(21) Appl. No.: 09/544,562

(22) Filed: Apr. 6, 2000

(51) Int. Cl.$^7$ .................................................. G02C 5/04
(52) U.S. Cl. .............................................. 351/128; 351/63
(58) Field of Search ........................... 351/63, 124, 128, 351/126; 2/454

(56) References Cited

U.S. PATENT DOCUMENTS

| | | |
|---|---|---|
| 2,285,615 * | 6/1942 | Ruchser ................................ 351/128 |
| 3,880,503 | 4/1975 | Uribe . |
| 3,936,165 | 2/1976 | Nosaka . |
| 4,367,929 | 1/1983 | Fortini . |

* cited by examiner

Primary Examiner—Huy Mai
(74) Attorney, Agent, or Firm—Snider & Associates; Ronald R. Snider

(57) ABSTRACT

A pair of eyeglasses as provided with a mechanism on the nose bridge making it possible to turn one of the glasses around. A side piece attached thereto turns over together with one of the glasses, with the result that both of the eyepieces will be displaced over the glasses on both sides so as to protect the glasses from impact and the like when folded. Located within the bridge nose main body is a screw surrounded by a spring. At each end of the screw there are washers which provide for ease of movement between the spring and the screw. The spring is under compression at all times. Still further, the screw is tightly thread fitted into the connecting portion of the bridge so as to prevent loosening.

5 Claims, 2 Drawing Sheets

FOLDABLE EYEGLASSES

BACKGROUND OF THE INVENTION

1. Field of the Invention

This invention relates to eyeglasses, and more particularly to eyeglasses wherein the eyeglasses are rotatable at the bridge portion, thereby allowing the lenses and the earpieces to be rotated thereby upon each other. The side pieces rotate to protect the lenses when the side pieces are in their folded state and the eyeglasses are rotated. A side piece which is attached at the temple turns together with one of the glasses with the result that both of the side pieces will be disposed over both of the glasses at both sides thereof.

2. The Prior Art

U.S. Pat. No. 3,936,165—Nosaki shows a bridge having a shaft extending therethrough. Surrounding the shaft is a spring which provides a force between a connecting portion and a main body. The spring is held in a continuous compressed state so that it imposes a constant bias pulling the connecting portion towards the main portion.

In this design, the shaft is pinned to the connecting portion. This prevents rotation of the shaft with respect to the connecting portion, and withdrawal of the shaft from the connecting portion. The spring around the shaft fits against a flange at the head end of the shaft and against an annular wall within the bridge. There is no washer between the annular wall and the end of the spring.

BRIEF SUMMARY OF THE INVENTION

An object of this invention is to provide eyeglasses having a mechanism for turning one of the glasses around so that the side piece attached thereto also turns together with one glass, resulting in the protection of both of the glasses at both sides by the attached side pieces which are disposed over the glasses on both sides so as to dispense with a protective case.

Another object is to secure the connecting portion to the shaft by means of a screw and thread connection which can be tightened in order to prevent loosening of the screw during repeated use by the eyeglass wearer.

Another objective of the invention is to provide at least one washer at one end of the spring surrounding the shaft. These washers provide additional ease of movement or rotation between the connecting portion and the main body portion, thereby preventing excess torque from being applied to the threaded connection between the connecting portion and the threads on the shaft which could cause the threads on the shaft to disengage from the connecting portion.

DETAILED DESCRIPTION OF THE PREFERRED EMBODIMENT

Figure 1:
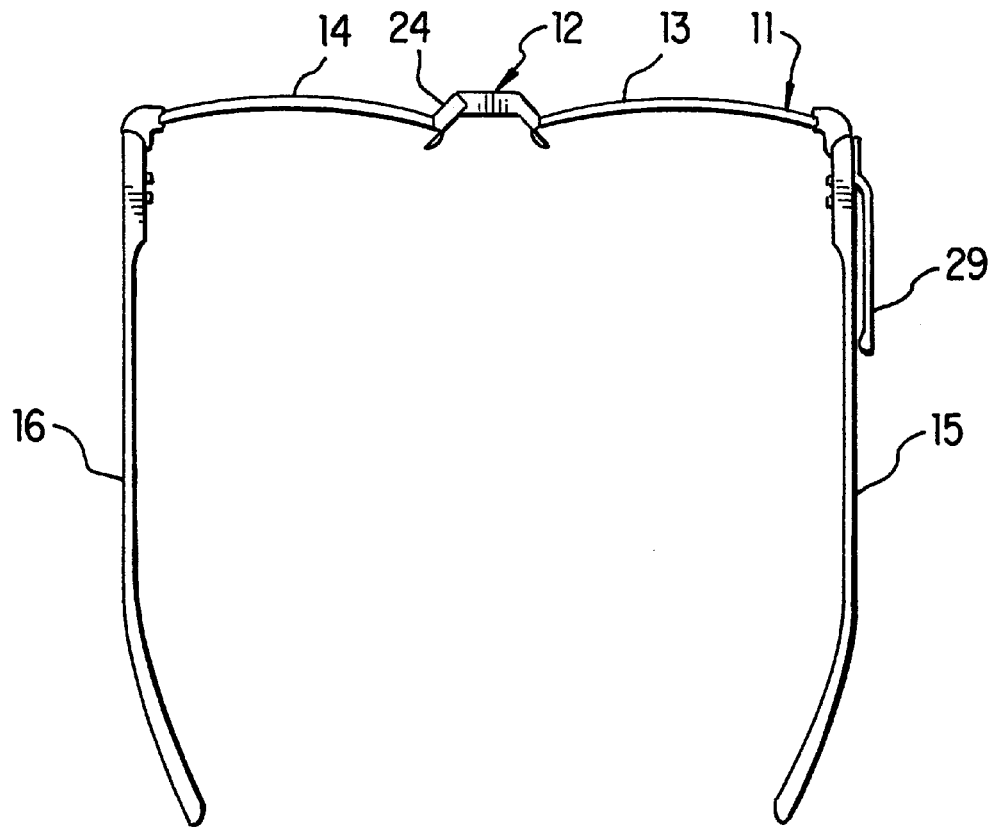
FIG. 1 is a plan view of the eyeglasses of this invention in the configuration where they are ready for wear.
Figure 2:
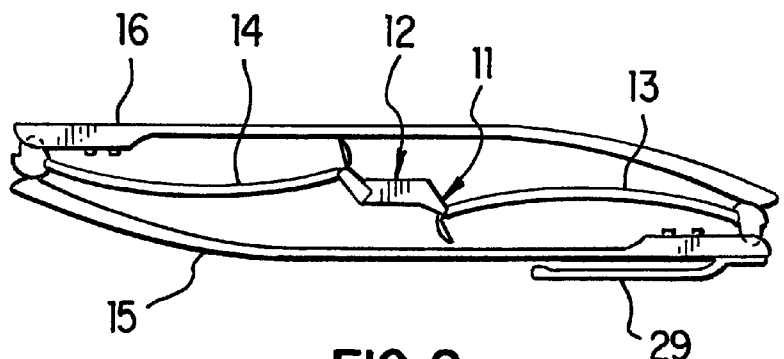
FIG. 2 is a plan view of the eyeglasses in their folded state.
Figure 3:
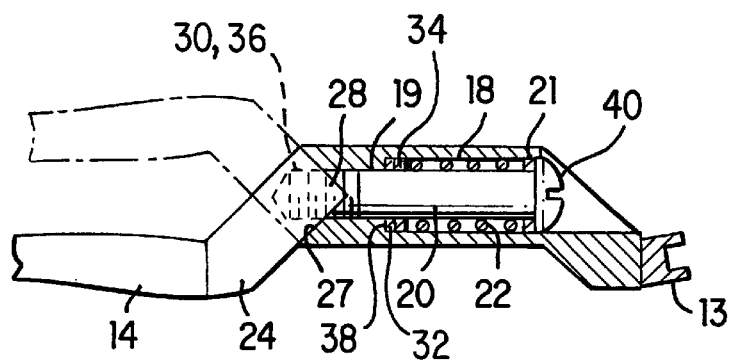
FIG. 3 is a sectional plan view of the bridge portion of the eyeglasses.
Figure 4:
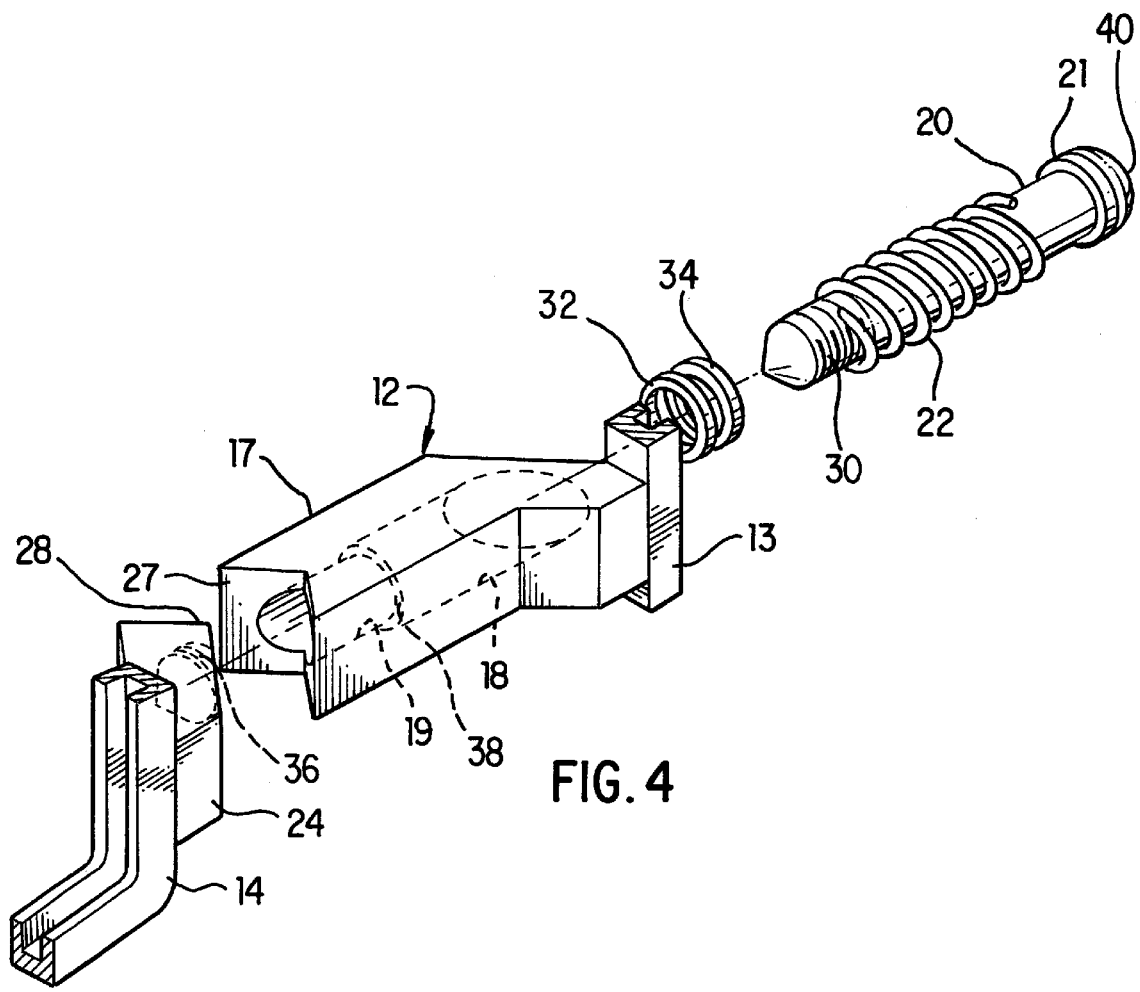
FIG. 4 is a perspective exploded view of the eyeglass bridge.

In the above FIGS. 1–4, reference number 12 designates the bridge, 13 and 14 designate the glass frames and 15, 16 designate the side pieces.

The bridge 12 comprises a main body 17. The inside space 19, which forms a diametrically enlarged chamber 18 between an intermediate point and the side of the assembly where rim 14 is connected. A shaft 20 is provided with a flange or washer 21 at the head end 40 thereof and extends slidably within space 19 with flange or washer 21 normally resting at the end of space 19. A spring 22 is wound over shaft 20 within the diametrically enlarged portion 18 and the spring 22 is held at one end by the flange or washer 21 and at the other end by washers 32 and 34 and by an annular wall portion 38 which partitions the diametrically enlarged portion 18. The spring 22 is held in compression at one end by flange or washer 21 and at the other end by the pair of washers 32 and 34. Washer 32 rests against annular wall 38. Annular wall 38 may be a tapered wall or may be a flat end wall. Spring 22 is held in a compressed state so that it may impose a constant bias pulling connecting portion 24 towards the main body 17. This can also be seen as pulling projection 28 into recess 27. The bridge main body 17 is fixed at the projecting portion thereof to the rim 13 by the usual connecting means. However, the main body end 17 forms a recess 27 which receives a projection 28 of the connecting portion. The side of the rim 14 which is connected to the connecting portion 24. The shaft 20 extends against the bias of the spring 22 and holds against the threaded connection 30, 36. The threaded connection 30, 36 provides firm engagement between the shaft 20 and the connecting portion 24 to prevent loosening of 24 with respect to shaft 20, thereby allowing the bridge to become disassembled. It can be seen that firm thread engagement is required because each time the bridge assembly is rotated, there will be a torque applied to the threaded connection portion 30, 36.

In this design, the shaft 20 is allowed to freely rotate inside of the enlarged portion 18 because there is provided very low friction between the spring 22, the flange 21, the head of the shaft 40 and the annular wall 38. This low friction is provided by the addition of washers 32 and 34 which provide for free and easy movement between the spring 22 and the annular wall 38. Friction can be further reduced by washer 21. This reduces the amount of torque applied to threads 30, 36, thereby substantially eliminating any tendency of the shaft 20 to become loosened from the connecting portion of 24 at the threaded connection. Applicant has tested this design and found that the glasses can be opened and closed up to 10,000 times without causing loosening of the shaft 20 from the connecting portion 24 at the threaded connection.

The sides pieces 15 and 16 may be fitted to the rims 13 and 14 respectively by means of hinges as is common in the art.

What is claimed is:

1. In a pair of eyeglasses, a pair of glass rims, and a bridge between the glass rims comprising:

a nose bridge having a recess at one end, said nose bridge having an inner space and a diametrically enlarged chamber inside;

a connecting portion;

a shaft with a flange or a washer at a head end, said shaft extending from inner space and having a threaded end;

a spring wound around said shaft sandwiched in a compressed state in said chamber between said flange or washer at the head end of said shaft and washer(s) which abut a wall, partitioning said chamber and said inner space wherein said spring biases said shaft in the direction of the head end; and a threaded connection between the shaft threaded end and a thread in the connecting portion, wherein a rim is connected to said connecting portion which detachably engages said bridge under the pulling effect of said spring, wherein said rim can be turned around to turned back by pulling said rim including said connecting portion away from said bridge.

2. The pair of eyeglasses of claim 1, further comprising a tight thread connection between the connecting portion and the shaft wherein the shaft will not rotate when said one rim is turned.

3. The pair of eyeglasses of claim 1, wherein there are at least two washers which abut the wall partitioning the chamber.

4. The pair of eyeglasses of claim 1, wherein when one eyeglass is turned around from a normal viewing position, side prices fold across each lens to individually protect each lens on both sides.

5. The pair of eyeglasses of claim 1, wherein the connecting portion detachably engages a recess formed at one end of the bridge.

* * * * *